July 4, 1944.   J. P. TARBOX   2,352,868
RAYON SPINNING CAGE
Filed March 15, 1941   2 Sheets-Sheet 1
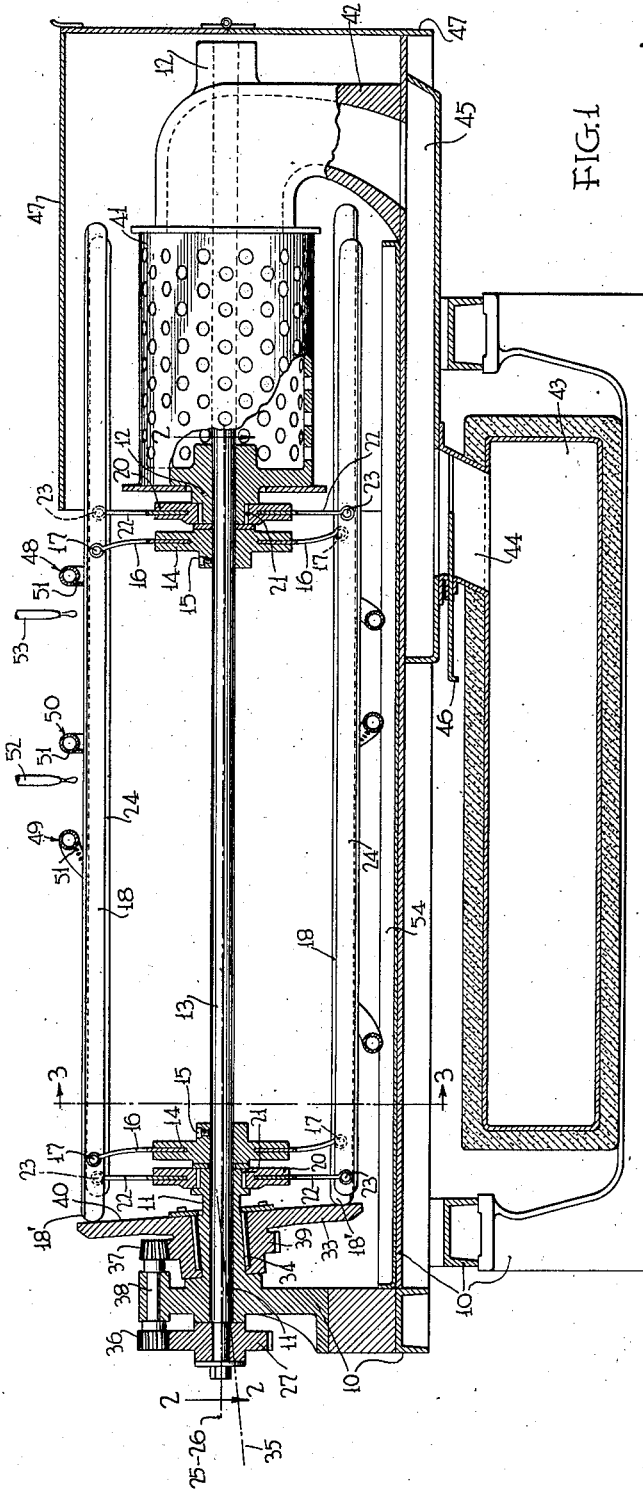
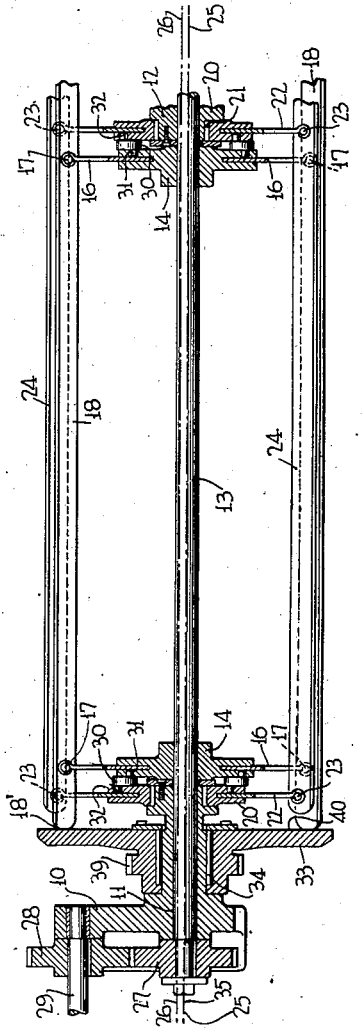
INVENTOR
John P. Tarbox July 4, 1944.   J. P. TARBOX   2,352,868
RAYON SPINNING CAGE
Filed March 15, 1941   2 Sheets-Sheet 2
FIG.3
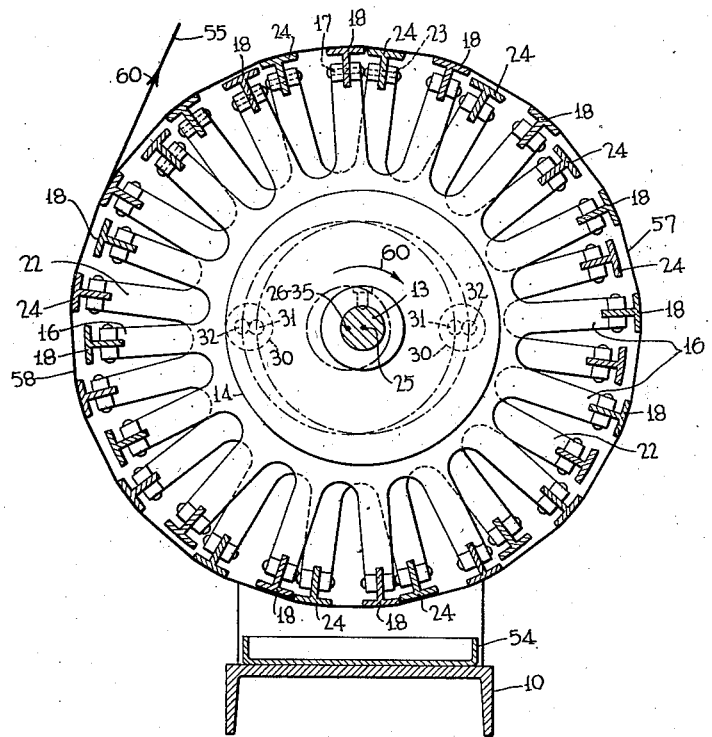
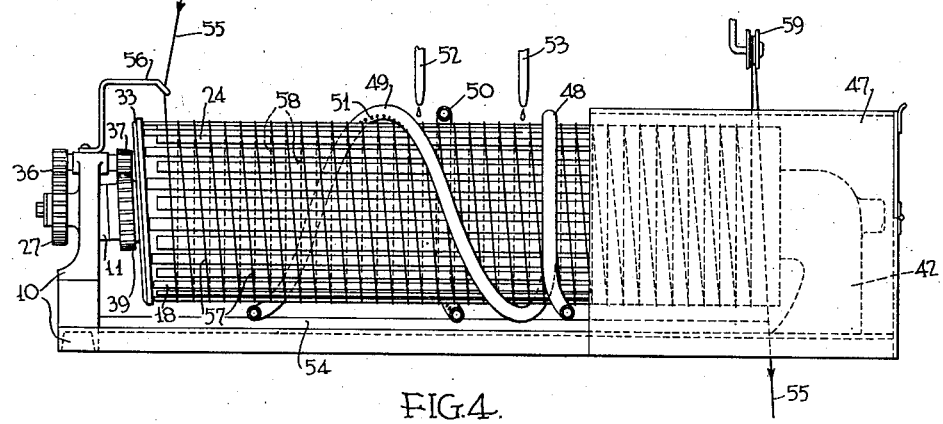
FIG.4.
INVENTOR
*J. P. Tarbox*

Patented July 4, 1944

2,352,868

UNITED STATES PATENT OFFICE 2,352,868

RAYON SPINNING CAGE

John P. Tarbox, Philadelphia, Pa., assignor, by mesne assignments, to Industrial Rayon Corporation, a corporation of Delaware Application March 15, 1941, Serial No. 383,628

8 Claims. (Cl. 28—71.5)

The invention relates to devices for treating threads, filaments and the like. More particularly, the invention relates to a reel comprising a plurality of groups of bars, the bars of the different groups alternating with each other and forming together a cage upon which the thread or the like to be treated is wound and advanced in axial direction in generally helical windings, the treatment of the filament or the like taking place during these movements.

Among the objects of the invention is the construction of a reel of the type referred to, which is simple and rugged in construction, and which supports and advances the thread or the like without undesirable stretching or slackening.

Certain objects of the invention are outstandingly achieved by separating the means for supporting the bars and moving them in circumferential direction from the means for imparting to the bars a relative axial movement.

Further objects, features and advantages of the invention will become apparent from the following description of one embodiment of the invention when read together with the attached drawings:

In the drawings,

Fig. 1 is a diagrammatic vertical section through a reel according to one embodiment of the invention;

Fig. 2 is a fragmentary horizontal section along line 2—2 of Fig. 1;

Fig. 3 is a vertical cross-section along line 3—3 of Fig. 1;

Fig. 4 is a fragmentary side elevation at a smaller scale of the reel shown in Fig. 1.

The numeral 10 designates a rigid supporting structure. This structure is provided with a bearing portion 11 at one end and with a pair of bearing portions 12 at and near to the other end. A shaft 13 is rotatably supported in said bearing portions. A pair of hub members 14 are mounted on and held as by screws 15 to the shaft 13, and each of the hub members is provided with generally radially extending spokes or links 16. The spokes or links 16 are of resilient material such as steel so that they may be flexibly held substantially at their points of attachment to the hub members, and are journalled by their outer free ends at 17 to bars 18, which latter extend generally parallel to the shaft 13. The bars 18 form together a generally cylindrical cage. The normal form of the spokes or links 16 is about that shown in the upper part of Fig. 1, while the spokes are under stress in the form shown in Fig. 1, below the shaft 13, and in Fig. 2.

A second pair of hub members 20 are rotatably supported on the outside of the supporting portion 11 and of the one supporting portion 12 by means of antifriction bearings 21. The members 20 are likewise provided with radially extending spokes or links 22 which are connected at 23 to a second set of bars 24. The bars 24 form together a second generally cylindrical cage. The spokes or links 22 need not be of resilient material but these spokes and the connections 23 may be rigid.

The axis 25 of the shaft 13 and the axis of rotation 26 of the hub members 20 are arranged parallel to but spaced from each other in the plane of Fig. 2. As the outer diameter of the individual cages formed, respectively, by the bars 18 and 24 is about the same, the eccentricity of the axes 25 and 26 results in a projection of the bars 18 outwardly beyond the bars 24 for about half the circumference of the entire drum structure, whereas, for the other half of the circumference, the bars 24 project outwardly beyond the bars 18.

The shaft 13 is connected through gears 27, 28 and a shaft 29 to a source of power which is not shown. The hub members 14 and 20 are connected by means of discs 30, which latter are provided with pins 31 and 32. Each pin 31 engages one hub member 14, and the appertaining pin 32 the adjacent hub member 20. The distance between the axes of the pins 31 and 32 is equal to the eccentricity of the axes 25 and 26 of the two individual cages. A pair of such driving members 30 between each two adjacent hub members 14 and 20 is shown in the embodiment, but any number of such driving members will serve the purpose.

A disc member 33 is rotatably supported such as by an antifriction bearing 34 on the supporting member 11. The axis of rotation 35 of this disc member is inclined to the axis 25 of the shaft 13 and the two axes 25 and 35 are arranged in the same vertical plane, as indicated in Figs. 1 and 2. The disc member 33 is driven at the same speed as the shaft 13 by means of pinions 36 and 37 being rigidly connected to the ends of a rotatably supported shaft 38, the pinion 36 engaging the gear wheel 27 and the pinion 37 engaging a toothed wheel 39 connected to disc member 33. The dimensions of the gears 27, 36, 37 and 39 are such that the shaft 13 and the disc member 33 rotate in unison. The rounded off ends 18' of the bars 18 are pressed against the surface 40 of the member 33 under the action of the resilient spokes or links 16.

The two bearings 12 are supported by a hollow structure 41, 42, the portion 41 being perforated so as to allow the passage of drying air from its interior. The drying air is supplied to the structure 41, 42 from a conduit 43 through a passage 44, 45, the effective cross-section of which may be regulated by a valve 46. The ends of the bars 18 and 24 extend beyond the inner bearing member 12 so as to surround the portion 41. These extended ends of the bars and the structure 41 are enclosed in a casing 47.

A pipe extends in a generally circular loop 48 and a generally helical loop 49 around the drum formed by the bars 18 and 24. A second pipe 50 likewise extends around a portion of the drum between the loops 48 and 49 of the other pipe. The two pipes are connected to a source of compressed air or gas and are provided with nozzles indicated at 51 through which the compressed air or gas is blown against the surface of the drum and toward the left-hand end of the drum.

52 and 53 are nozzles through which treating fluids are dripped or sprayed upon the circumference of the drum, and 54 is a basin for collecting the fluid after it drips or runs off the drum.

55 is a thread, filament or the like which, after passing a guide 56, is wound upon the drum. On one-half of the circumference of the drum, the thread is supported by the bars 18 in half circular windings 57, which are inclined to the axes 25, 26, whereas, on the other half of the circumference of the drum, the thread is supported by the bars 24 on half circular windings 58 which extend perpendicular to said axes. At the other end of the drum, the thread is led away over a guiding role 59.

In operation, the thread or the like 55 is continuously fed at one end wound upon and moved along the drum in windings 57, 58. The treating fluid which would, of course, have the tendency to run straight down along the windings to the collecting basin or trough 54 and to be partly carried along with the thread toward the take-off end of the drum, is forced by the currents of air or gas emanating from the pipes 48, 49 and 50 to move in the opposite direction, that is, in counterflow to the direction of the movement of the thread. Such counterflow is highly desirable for an effective treatment of the thread or the like.

The method of and the means for creating the counterflow between the thread or the like and the treating fluid are claimed in the inventor's application Serial No. 411,312, "Method of and device for treating threads and the like," filed September 18, 1941, which is a division of the present application.

The new device and the method of its operation are applicable for many treatments of filaments or the like such as for the aftertreatment of freshly spun artificial fibres in any known process, for instance, the cuprammonium or viscose process.

The invention is, of course, not restricted to the specific embodiment shown in the application, but the invention is liable to many different embodiments, all of which are intended to be covered by the spirit of the language of the attached claims.

What is claimed is:

1. Device for continuously treating threads, filaments, or the like; said device including a rotatable drum upon which the thread or the like is wound and advanced in the longitudinal direction of the drum in generally helical turns; the circumferential portion of said drum being composed of two sets of bars, the bars of different sets alternating with each other; means for supporting the bars rotatably about axes extending in the longitudinal direction of the drum, the axis of rotation for the one set of bars being eccentrically arranged to the axis of rotation for the bars of the other set, so that the bars of each one set project radially outwardly for a portion of the circumference of the drum beyond the bars of the other set; the supporting means for at least one set of bars being adapted to allow reciprocal composite movement of the bars in their general longitudinal direction; means separate from said supporting means adapted to reciprocate said reciprocably supported bars once during each rotation of the drum; said last-named means comprising a structure which is rotatably supported by a stationary part of the device, the axis of rotation for that structure being inclined and extending near to the axis of rotation of the reciprocable bars; said reciprocable bars engaging and rotating with said structure.

2. Device for continuously treating threads, filaments, or the like; said device including a rotatable drum upon which the thread or the like is wound and advanced in the longitudinal direction of the drum in generally helical turns; the circumferential portion of said drum being composed of two sets of bars, the bars of different sets alternating with each other; means for supporting the bars rotatably about axes extending in the longitudinal direction of the drum, the axis of rotation for the one set of bars being eccentrically arranged to the axis of rotation for the bars of the other set, so that the bars of each one set project radially outwardly for a portion of the circumference of the drum beyond the bars of the other set; the supporting means for at least one set of bars being adapted to allow reciprocal composite movement of the bars in their general longitudinal direction; means separate from said supporting means adapted to reciprocate said reciprocably supported bars once during each rotation of the drum; said last-named means comprising a structure which is rotatably supported by a stationary part of the device, the axis of rotation for that structure being inclined to and intersecting the axis of rotation of the reciprocable bars; said reciprocable bars engaging and rotating with said structure.

3. Device for continuously treating threads, filaments, or the like, said device including a rotatable drum upon which the thread or the like is wound and advanced in the longitudinal direction of the drum in generally helical turns; the circumferential surface of said drum being formed by two sets of bars, the bars of different sets alternating with each other; means for supporting the bars rotatably about axes extending in the longitudinal direction of the drum, the axis of rotation for the one set of bars being eccentrically arranged to the axis of rotation for the bars of the other set, so that the bars of each one set project radially outwardly for a portion of the circumference of the drum beyond the bars of the other set; at least one set of bars comprising a pair of link members for each bar, said members extending radially, the members of each pair being spaced from each other in the longitudinal direction of the drum, each member having its outer end connected to one bar and the inner end to a central rotatable member; said link members being adapted to allow reciprocal composite movement of each bar of the respective set in its generally longitudinal direction and transversely to that direction so as to keep corresponding points of adjacent bars of the same set always at about the same distance; means separate from said supporting means adapted to reciprocate said reciprocably supported bars once during each rotation of the drum.

4. Device for continuously treating threads, filaments, or the like, said device including a rotatable drum upon which the thread or the like is wound and advanced in the longitudinal direction of the drum in generally helical turns; the circumferential surface of said drum being formed by two sets of bars, the bars of different sets alternating with each other; means for supporting the bars rotatably about axes extending in the longitudinal direction of the drum, the axis of rotation for the one set of bars being eccentrically arranged to the axis of rotation for the bars of the other set, so that the bars of each one set project radially outwardly for a portion of the circumference of the drum beyond the bars of the other set; the supporting means for at least one set of bars being adapted to allow reciprocal movement of each bar of the respective set in its generally longitudinal direction; spring means adapted to force the reciprocable bars in one direction; means separate from said supporting means adapted to move said reciprocably supported bars once during each rotation of the drum in the direction oppositely to the direction of said spring means; said moving means comprising a member which is supported by a stationary portion of the device and which comprises a cam surface, said surface being inclined to the axis of rotation of the bars and being engaged by said reciprocable bars.

5. Device for continuously treating threads, filaments, or the like; said device including a rotatable drum upon which the thread or the like is wound and advanced in the longitudinal direction of the drum in generally helical turns; said drum comprising two sets of bars arranged around the circumference of the drum the bars of different sets alternating with each other; means for supporting the bars rotatably about axes extending in the longitudinal direction of the drum, the axis of rotation for the one set of bars being eccentrically arranged to the axis of rotation for the bars of the other set, so that the bars of each one set project radially outwardly for a portion of the circumference of the drum beyond the bars of the other set; the supporting means for at least one set of bars being adapted to allow reciprocal movement of each bar of the respective set in its generally longitudinal direction; said supporting means comprising a pair of link members for each bar at least one of said members of each pair being in the nature of a spring; said members extending radially, the members of each pair being spaced from each other in the longitudinal direction of the drum, each member having its outer end connected to one bar and the inner end to a central rotatable member; means separate from said supporting means adapted to force said reciprocably supported bars once during each rotation of the drum in one direction against the action of said spring natured members while allowing thereafter the return of the bars under the action of said spring natured members.

6. Device for continuously treating threads, filaments, or the like; said device including a rotatable drum upon which the thread or the like is wound and advanced in the longitudinal direction of the drum in generally helical turns; the circumferential portion of said drum being composed of two sets of bars, the bars of different sets alternating with each other; means for supporting the bars rotatably about axes extending in the longitudinal direction of the drum, the axis of rotation for the one set of bars being eccentrically arranged to the axis of rotation for the bars of the other set, so that the bars of each one set project radially outwardly for a portion of the circumference of the drum beyond the bars of the other set; the supporting means for at least one set of bars being adapted to allow reciprocal composite movement of the bars in their general longitudinal direction and in radial direction; means separate from said supporting means adapted to reciprocate said reciprocably supported bars once during each rotation of the drum; said last-named means comprising a structure which is rotatably supported by a stationary part of the device, the axis of rotation for that structure being inclined to and intersecting the axis of rotation of the reciprocable bars; said reciprocable bars engaging and rotating with said structure, the design and arrangement of the supporting means and of said means for imparting reciprocal movement to the bars being such that at about the middle of the movement of each bar in either direction the connecting points between the appertaining supporting means and the bar lie on a line perpendicular to the axis of rotation of the bar.

7. In a reel for storing and axially advancing filaments, threads or the like in a generally helical path about a central axis, a structure supported rotatably about said axis and means for rotating said structure, a plurality of bars adapted for carrying the filaments or the like mounted about said axis on said structure to rotate therewith, bar reciprocating means for axially moving said bars, said reciprocating means being arranged to rotate with said bars and with said structure about said axis.

8. In a reel for storing and axially advancing filaments, threads or the like in a generally helical path about a central axis, comprising a rotatable support for a plurality of bars and cam means for moving in one axial direction said bars while they are in carrying contact with the filaments or the like, said cam means rotating with said support and said bars about said axis.

JOHN P. TARBOX.